No. 896,550.
PATENTED AUG. 18, 1908.
J. J. JOINES.
FARE RECORDER.
APPLICATION FILED DEC. 2, 1907.
2 SHEETS—SHEET 1.
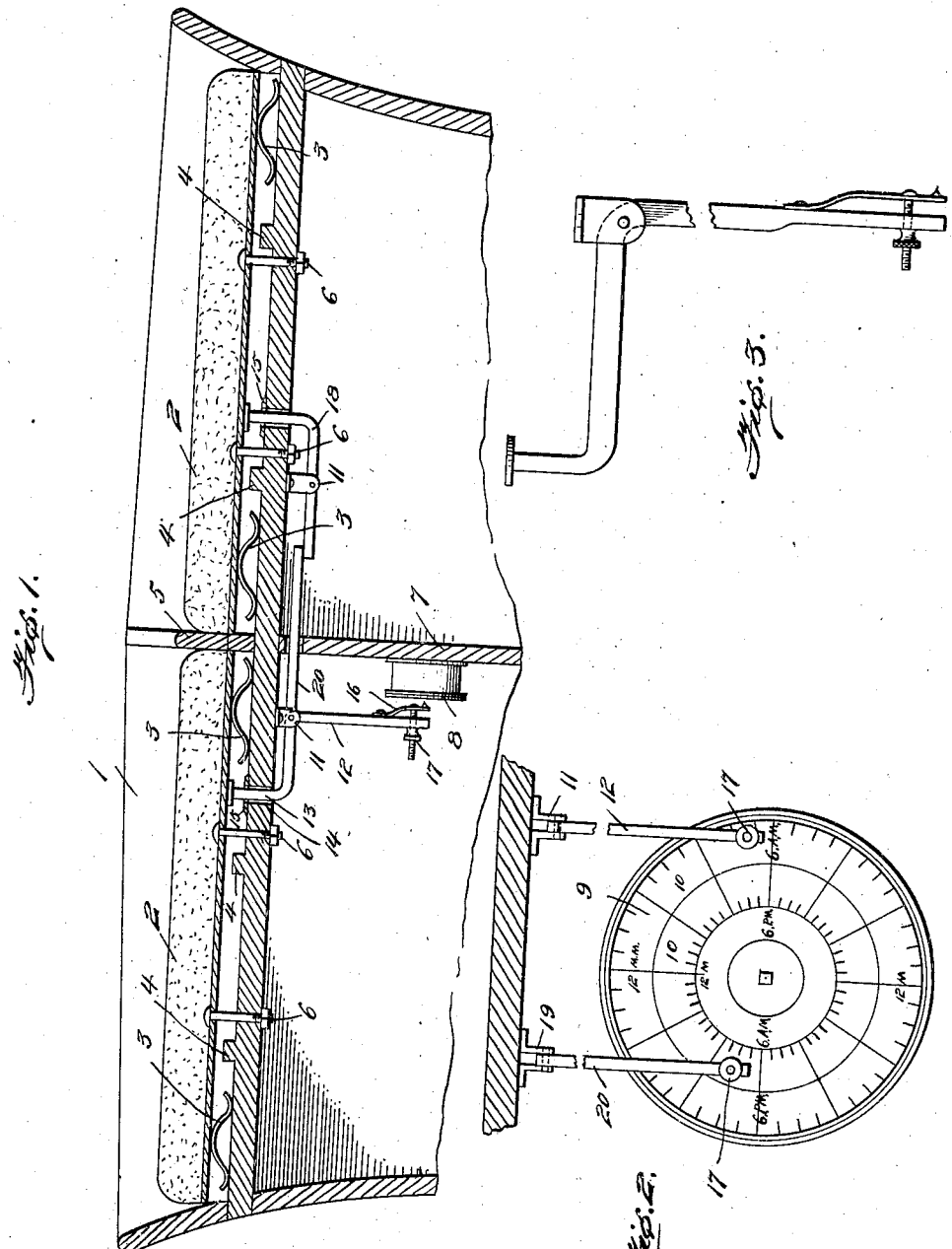

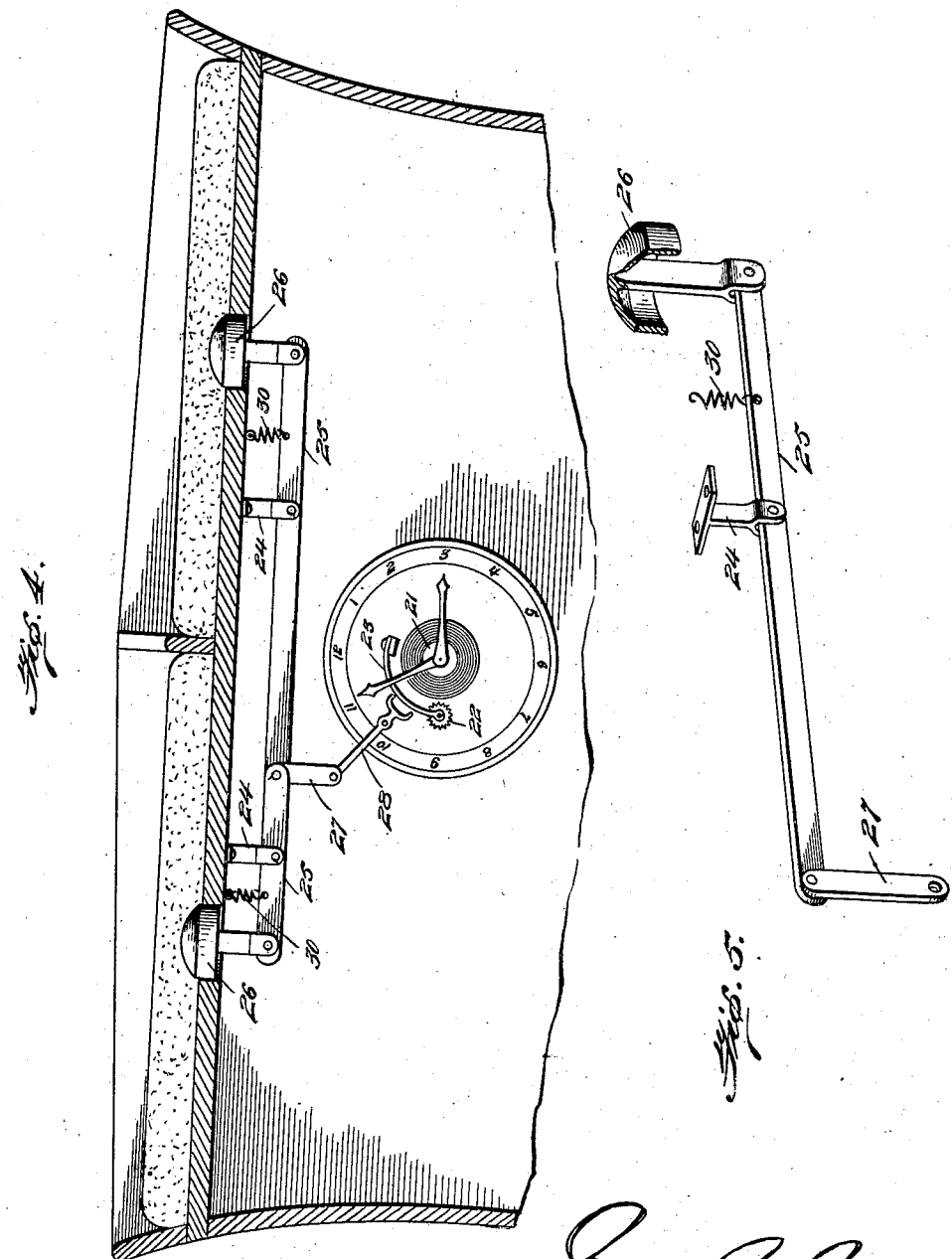

UNITED STATES PATENT OFFICE.

JAMES J. JOINES, OF ATLANTA, GEORGIA.

FARE-RECORDER.

No. 896,550.      Specification of Letters Patent.    Patented Aug. 18, 1908.

Application filed December 2, 1907. Serial No. 404,648.

*To all whom it may concern:*

Be it known that I, JAMES J. JOINES, a citizen of United States, residing at Atlanta, in the county of Fulton and State of Georgia, have invented certain new and useful Improvements in Fare-Recorders, of which the following is a specification.

My invention relates to improvements in fare registers, and has for its object, the provision of a combined register and recorder which may be readily applied to barber chairs, cabs or other vehicles, or to any other like place which the customer or passenger is caused to occupy while being served, and which will keep a continuous record, indicating the exact time of occupancy of each separate passenger or customer and the period or length of the occupancy, so that by this means, the owner of the cab or other vehicle will be informed of the exact amount of time his vehicle was in service and the proper amount earned during such service. Besides thus affording a record for the owner, such record will also serve as a check to indicate whether the cab-driver or other agent makes proper return of the proceeds to his employer.

Another object of my invention is the provision of a fare recorder of simple and durable construction which will not readily become disarranged or get out of order, which will be absolutely accurate and reliable in operation, and which will be practical and efficient in every particular.

With the above and other objects in view, my invention consists of a recorder and indicating mechanism operated by the occupant of the vehicle or other such device to engage the recorder to produce a continuous record of the occupancy.

My invention further consists of a fare register and recorder embodying certain other novel features of construction, combination and arrangement of parts substantially as disclosed herein and as illustrated in the accompanying drawings, in which.

Figure 1, is a longitudinal sectional view of a vehicle seat showing the preferred form of my fare recorder applied thereto. Fig. 2, is a face view of the recording dial. Fig. 3, is a detached enlarged view of one of the indicating and recording members. Fig. 4, is a longitudinal sectional view of a seat showing a slightly modified form of the invention applied thereto. Fig. 5, is a detail view of the lever operating means for the form of the invention shown in Fig. 4.

In the drawings: The invention is shown as applied to the seat of a vehicle but of course it will be understood that I do not limit it to such usage, as it may be employed for recording purposes wherever practicable. The numeral 1, designates the seat proper, which in this case is a double one, having a pair of cushions 2, mounted thereon. Springs 3, arranged at the ends of the cushions serve to support the cushions yieldingly, and the blocks or supports 4, take the weight off the springs and support the cushions when there is any weight thereon. A division or partition 5, is placed between the adjoining cushions so that one person will not occupy more than one seat or cushion. Guide bolts 6, are engaged in the stationary seat and pass up loosely through the cushions, the heads of the bolts serving to secure the cushions in place and prevent removal of the same.

Depending from the seat or otherwise suitably supported, is the vertical wall or support 7, on which is mounted the clock mechanism 8, the clock mechanism being in the form of a recorder having a revolving dial or face on which is mounted a circular chart 9, which serves as a record sheet. This chart has a number of annular recording spaces or rings 10, according to the number of cushions or seats whose occupancy is to be determined. In the drawings as shown in Fig. 2, there being two seats, two such annular recording spaces are provided on the chart, an inner and an outer one and the charts are divided into hour and minute intervals as shown. The charts preferably show a period of twenty-four hours duration, although charts of greater or less recording capacity may be used according to different requirements.

Hangers 11, are mounted on the lower face of the seat on each side of the vertical wall or support, and journaled in one of these hangers, (the one to the left in Fig. 1) is the bell crank or angular lever 12, the lever being journaled centrally or at the vertex of the angular sides thereof. The horizontal portion of the angular lever terminates at the outer end in an angular upright portion 13, which passes up through a guide opening 14, in the seat and the guide ring 15. This upper terminal of the bell crank is preferably headed as shown and is adapted to be contacted and depressed by the seat when there is any weight placed thereon. To the lower end of the angular lever, a spring 16, is secured which carries at its end a pencil or other recording device which is adapted when the lever is depressed, to engage the chart on the face of the dial. The thumb nut adjusting screw 17, serves to regulate the tension of the spring and cause proper engagement of the pencil with the recorder. In the hanger on the opposite side of the vertical support, is pivoted an angular lever 18, having an upright extension as before described which passes up through the seat and is adapted to be contacted by the seat. An additional hanger 19, is provided on a line with the first described one, and in this additional hanger is pivoted a second bell crank 20, carrying at its lower end a spring supported pencil or indicator as before described for engagement with the recorder. The lateral or horizontal portion of this second bell crank is engaged at its outer end by the end of the horizontal portion of the angular lever 18. From this it will be seen that the recording mechanism carrying the chart is in continuous operation, and that when one or more of the seats are occupied, the angular levers are depressed thereby and the pencils are caused to engage the chart thereby producing a continuous record of the period of occupancy.

In the form of the invention illustrated in Fig. 4, the recorder is in the form of a "watch man's" clock carrying a paper reel 21, which carries a web or ribbon of paper. A tracing wheel 22, is supported in a spring 23, above the ribbon, and as many tracing wheels are employed as there are seats to be reported. Hangers 24, are mounted beneath the seats as before, and levers 25, are fulcrumed in the hangers which carry at their outer ends the push buttons 26, adapted to be depressed by the cushions or seats. A link 27, depends from the inner end of each of the levers 25, and to the lower end of each link is pivotally connected a dog 28, which in turn is pivoted to the recording mechanism and is adapted when rocked to engage the spring carrying the tracing wheel and cause the tracing wheel to engage the record tape. An abutment 29, limits the upward movement of the inner end of the levers, and springs 30, serve to bring the parts to normal position when the seats are not occupied. In the case just described, the occupant of the seat causes the push button to be depressed, thereby rocking the horizontal lever, which by means of the connecting link conveys a rocking motion to the dog, which in turn depresses the tracing wheel to produce a record on the tape. A tracing wheel and connections similar to those described are provided for on each cushion or seat as will be understood.

From the foregoing description taken in connection with the drawings, the operation and advantages of my improved fare recorder will be readily understood and appreciated and it will be apparent that I have produced a practical and efficient device which fully accomplishes all the results herein set forth as the objects of my invention.

I claim:

A seat recorder for passenger vehicles comprising in combination a bench, a transverse division wall dividing said bench into two parts, seat cushions arranged on each side of said division wall, bowed springs interposed between the bench and the seats to yieldingly support the seats, transverse cleats secured to the bench to support the seats when occupied, securing bolts passed through the bench with their heads fastened in the seats to limit the upward movement of the seats, journal brackets secured to the under face of the bench, levers journaled in said brackets and having upright plunger portions extending up through openings in the bench to be engaged by the seats, one of said levers having a depending angular arm, a crank lever having a depending angular arm and journaled in one of the brackets having its horizontal portion engaged by the horizontal portion of the other lever, springs carried by the depending angular arms, recording points carried by said springs, screws for adjusting the tension of the springs, and clock mechanism carrying a record on its face to be engaged by the recording points.

In testimony whereof I affix my signature in presence of two witnesses.

JAMES J. JOINES.

Witnesses:
G. H. STONE,
E. W. MONTEITH.